United States Patent [19]

Azzani et al.

[11] Patent Number: 5,013,514
[45] Date of Patent: May 7, 1991

[54] PROCESS FOR THE CONSTRUCTION OF HOLLOW MONOLITHIC ELEMENTS OF COMPOSITE MATERIAL, PARTICULARLY CARBON FIBRES

[75] Inventors: Roberto Azzani, Modena; Lino M. Dori, Fiorano Modenese; Oscar Scaglietti, Montale Di Castelnuovo Rangone, all of Italy

[73] Assignee: Ferrari Engineering S.p.A., Modena, Italy

[21] Appl. No.: 439,976

[22] Filed: Nov. 21, 1989

[30] Foreign Application Priority Data

Nov. 22, 1988 [IT] Italy ............... 68035 A/88

[51] Int. Cl.⁵ ............................................. B32B 31/20
[52] U.S. Cl. ............................... 264/512; 156/155; 156/156; 156/285; 156/382; 264/101; 264/137; 264/258; 264/314
[58] Field of Search ............... 156/285, 382, 189, 156, 156/286, 155, 190, 191, 192; 264/258, 512, 137, 101, 314, 317

[56] References Cited

U.S. PATENT DOCUMENTS

| 2,739,350 | 3/1956 | Lampman | 156/155 X |
| 3,943,020 | 3/1976 | Ashton et al. | 156/156 |
| 3,962,393 | 6/1976 | Blad | 264/571 |
| 3,962,394 | 6/1976 | Hall | 156/285 X |
| 3,964,846 | 6/1976 | Bliss | 425/818 |
| 4,126,659 | 11/1978 | Blad | 156/189 X |
| 4,180,426 | 12/1979 | Oustin et al. | 156/286 X |
| 4,780,262 | 10/1988 | Von Volkli | |

Primary Examiner—John J. Gallagher
Assistant Examiner—Michele K. Yoder
Attorney, Agent, or Firm—Shlesinger Arkwright & Garvey

[57] ABSTRACT

The process makes use of a lost core of polystyrene, on which are wrapped and compacted, in successive stages, various sheets or mats of carbon fibre, of known type; a first compaction is effected in an autoclave after having sealingly wrapped the core, before lamination of the carbon fibre layers, in a first polythene envelope, and after having sealingly wrapped the partly finished product constituted by the core wrapped in the first polythene envelope and some of the carbon fibre sheet or mat in a second polythene envelope, by creation of a vacuum within the interior of the second envelope, while maintaining the interior of the first envelope in communication with the outside of the second envelope; a second compaction, after removal of the second envelope, following lamination of further sheets or mats and possible mounting of metal inserts on the core and insertion of the partly finished product thus obtained between a pair of mould halves, is effected in an autoclave by wrapping the two mould halves, preliminarily fixed together, in a third polythene envelope connected in a fluid-tight sealing manner to the first envelope and within which is created a vacuum, while the interior of the first envelope is left connected to the interior of the autoclave; there follows a polymerization and curing in the autoclave of the laminated sheets or mats in a known standard cycle.

19 Claims, 4 Drawing Sheets

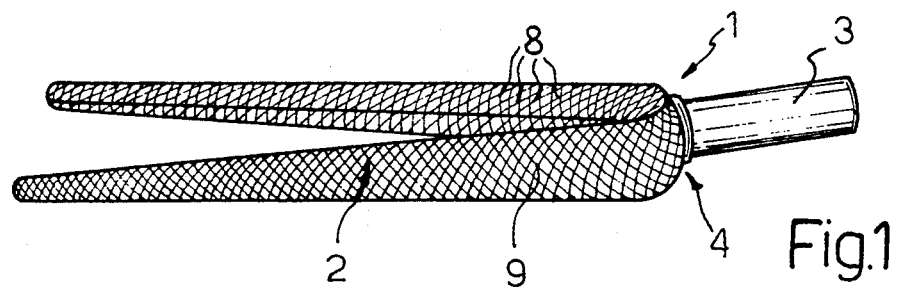
Fig.1
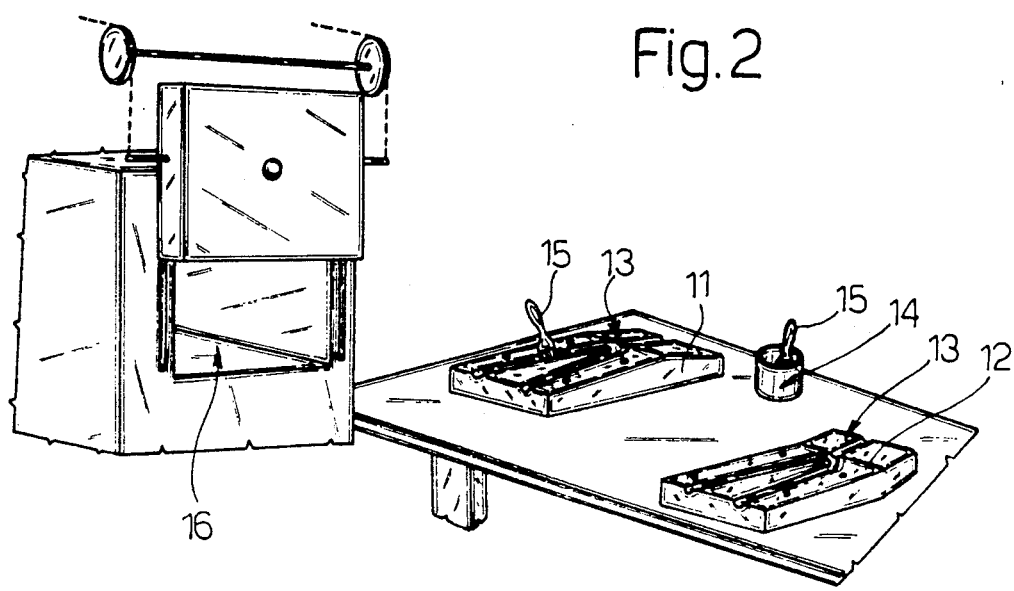
Fig.2
Fig.9
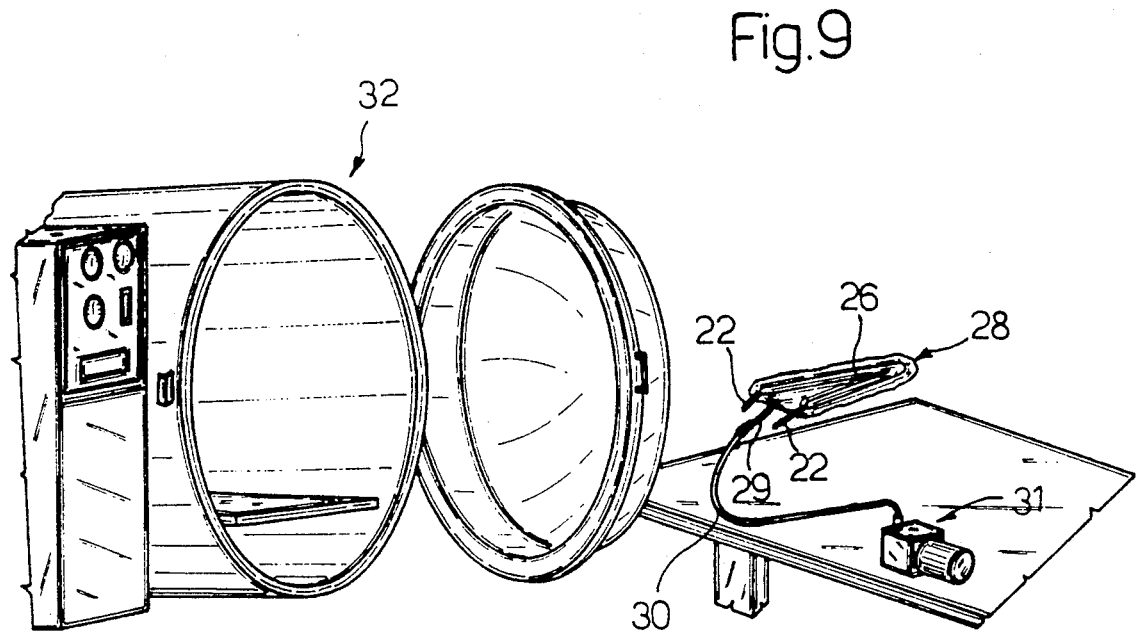

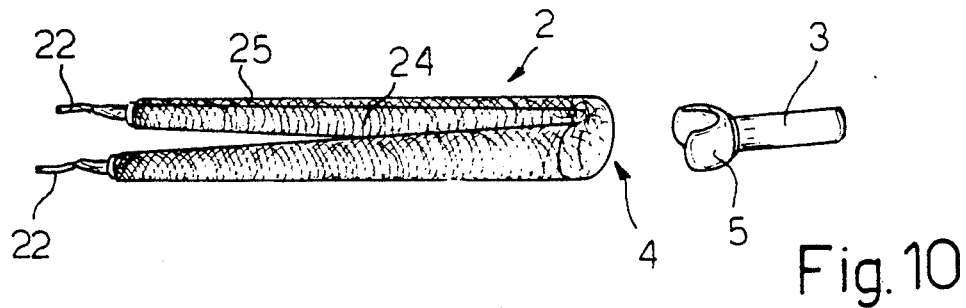
Fig.10
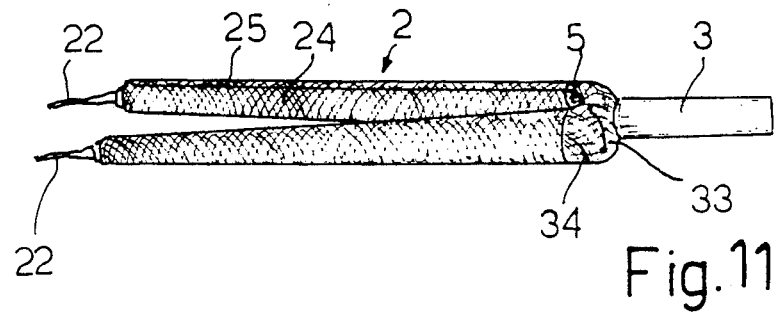
Fig.11
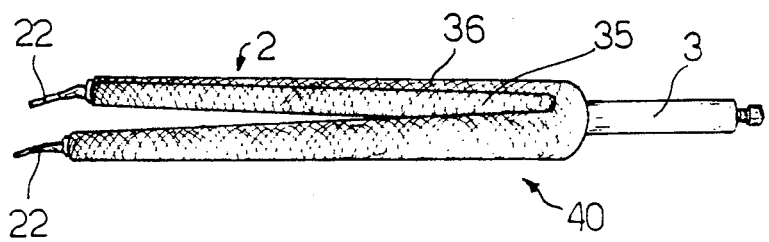
Fig.12
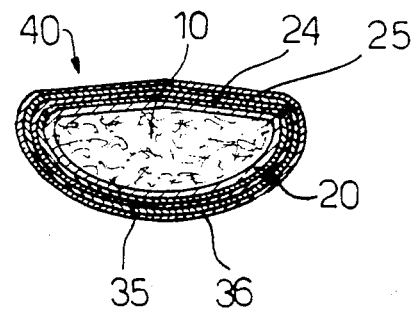
Fig.13
Fig.14
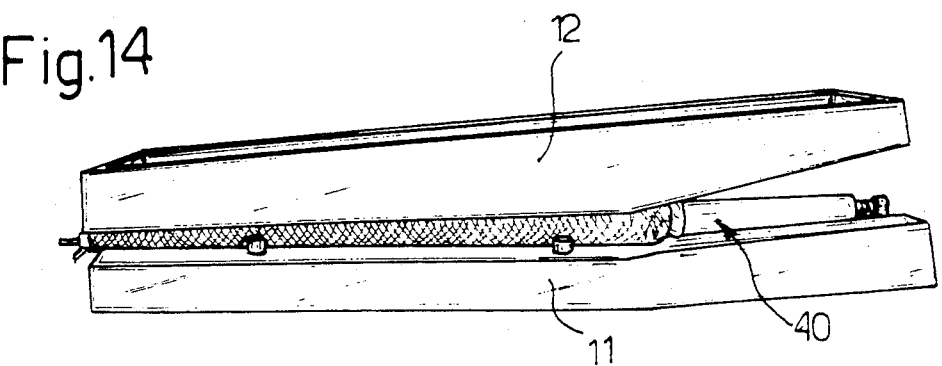

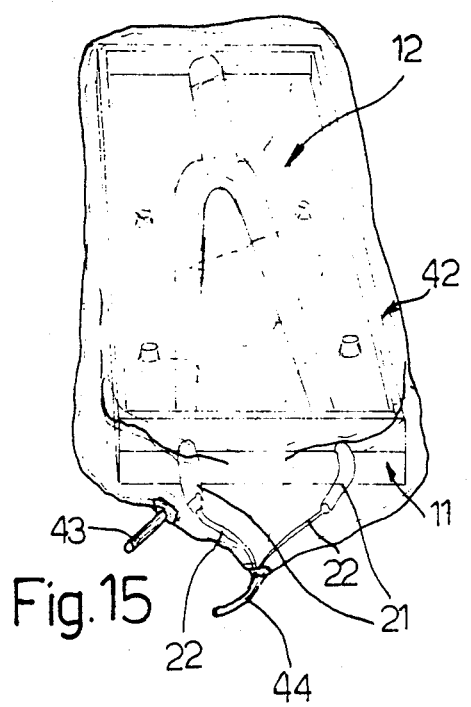
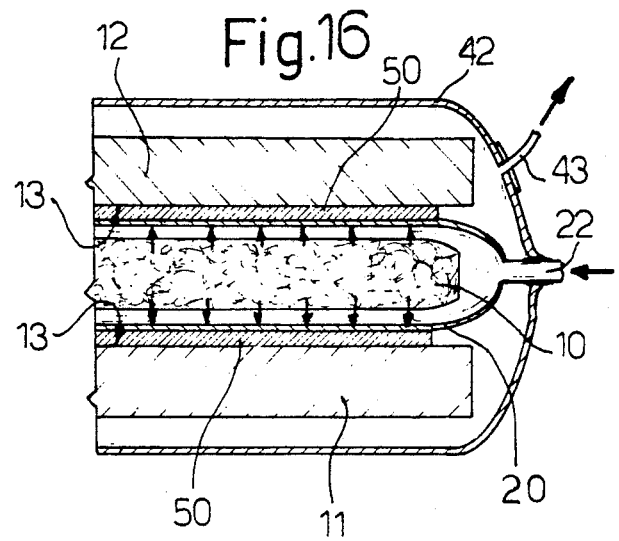
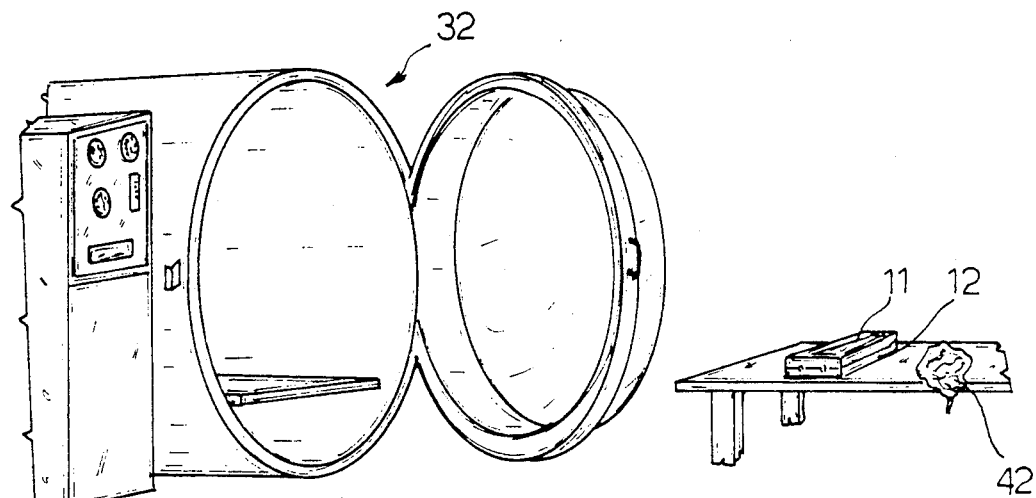
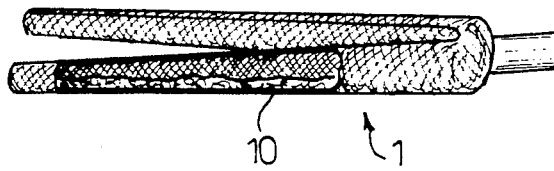
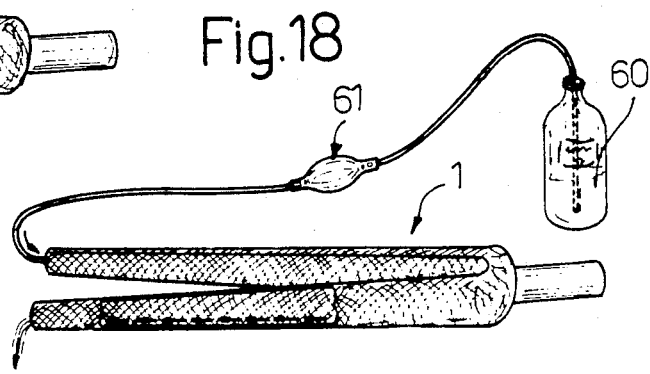

PROCESS FOR THE CONSTRUCTION OF HOLLOW MONOLITHIC ELEMENTS OF COMPOSITE MATERIAL, PARTICULARLY CARBON FIBRES

BACKGROUND OF THE INVENTION

The present invention relates to a process for the production of hollow monolithic elements of composite material, in particular carbon fibre formed in layers or sheets by impregnation of the fibres with thermosetting synthetic plastics resin, preferably epoxy resin. The present process is described with particular reference to the production of a hollow fork for bicycles, but can be applied to any form of hollow mechanical component.

Hollow mechanical elements made of composite material, in particular carbon fibre impregnated with epoxy resin, are known.

Such elements are normally formed as two half-shells which are then fixed together by adhesive and/or by other methods. The half-shells are obtained by means of a compaction of a plurality of sheets or mats of carbon fibre against a mould cavity by wrapping the mould in a bag within which a vacuum is formed and, subsequently, introducing the mould, bag and mats or sheets of carbon fibre into an autoclave where these latter are welded to one another by polymerisation and cured or "matured", in such a way as to obtain half-shells with the desired characteristics of mechanical strength, density and finish, then adopting a standard cycle, known to anyone skilled in the art, of heating and pressurisation (for example by maintaining the mould in an autoclave at three bar and 140°–200° C. for a time varying from several minutes to several hours, depending on the dimensions of the workpiece to be formed and the materials used.

However, hollow articles obtained by fixing together half-shells on the one hand can present inferior mechanical characteristics to those obtainable from a monolithic article of the same material and dimensions and, on the other hand, present an unsatisfactory aesthetic appearance in that the junction line remains visible; moreover, producing hollow articles by the connection of half-shells is relatively laborious, time consuming and expensive in that it requires an extra operation (that of connection) with respect to the production of a monolithic article, as well as the precise positioning of the components to be joined. On the other hand, with the known techniques it is substantially impossible to produce monolithic hollow workpieces of all shapes in composite material in that, in order to produce them, it is evidently necessary to utilise an entirely round core which must be rigid in order to permit compaction of the sheets or mats before polymerisation. Therefore, except in the case of cylindrical or conical articles, that is of simple form, it is currently impossible to eliminate the core from the interior of the finished article, with a consequent considerable increase in the weight of the finished article; this disadvantage remains even when utilising cores of gypsum, in that these cannot be completely eliminated, not even by the introduction of water or steam. On the other hand, the use of a "lost" core which can easily be eliminated is currently impossible in that, on the one hand, the polymerisation temperatures are well above the fusion temperature (or softening temperature) of wax or thermoplastic cores and, on the other hand, cores of expanded plastics materials which can be eliminated using solvents are not rigid so that they would squash if subjected to the pressures commonly utilised in the polymerisation stage.

SUMMARY OF THE INVENTION

The object of the invention is that of providing a process for the production of hollow monolithic elements of composite material utilising sheets or mats of impregnated fibres wound on a core, which allow the use of a core which can be easily eliminated and which, at the same time, allows a correct compaction of the sheets or mats to be obtained.

The said object is achieved by the invention, which relates to a process for the production of a hollow monolithic element of composite material by winding and superimposing onto a core a plurality of mats or sheets constituted by fibres impregnated with synthetic plastics resins, compaction of the said sheets or mats, and subsequent polymerisation and curing thereof, positioning the said core between two mould halves clamped against one another in an autoclave at a predetermined temperature and pressure for a time such as to cause the mutual adhesion thereof, characterised by the fact that there is utilised a "lost" core made of an easily eliminable expanded synthetic resin, and by the fact that the compaction of the sheets or mats is effected in the following stages:

(a) wrapping the core in a fluid-tight manner in a first envelope provided with means for ensuring the hydraulic connection of the interior of the envelope to the environment outside the envelope;

(b) laminating first said sheets or mats onto the core clad with the said first envelope;

(c) wrapping the partly finished product thus obtained in a fluid-tight manner with a second envelope in such a way as to leave the interior of the said first envelope, by means of the said hydraulic connection means, in communication with the outside of the said second envelope;

(d) creation of a depression within the interior of the said second envelope, and creation of an increased pressure outside the said second envelope and, via the said hydraulic connection means, within the interior of the said first envelope;

(e) removal of the said second envelope and lamination onto the said core and the said first sheets or mats second sheets or mats necessary to form the said element;

(f) inserting the thus obtained partly finished product between the said mould halves, mutual clamping of these latter and wrapping them in a fluid-tight manner with a third envelope leaving the interior of the said first envelope in communication with the outside of the third envelope through the said hydraulic connection means; and (g) creation of a depression within the interior of the said third envelope and an excess pressure outside thereof and, through the said hydraulic connection means within the said first envelope.

BRIEF DESCRIPTION OF THE DRAWINGS

For a better understanding of the invention there is now given an absolutely non-limitative description of an embodiment thereof applied, purely by way of example, to the production of a fork for a bicycle, with reference to the attached drawings, which illustrate various stages, in which:

FIG. 1 illustrates a perspective view of a monolithic hollow mechanical element of composite material which can be made with the process of the invention, in the specific example constituted non-limitatively by a fork for a bicycle;

FIG. 2 illustrates a first stage of the production process according to the invention;

FIGS. 7, 8 and 9 illustrate a fourth stage of the process according to the invention;

FIGS. 10, 11 and 12 illustrate further stages of the process of the invention;

FIG. 13 illustrates in section a partly finished product obtained after the stage of FIG. 12;

FIGS. 14, 15, 16 and 17 illustrate further stages of the process of the invention;

FIG. 18 illustrates a partly cut-away perspective view of the partly finished product after the stage of FIG. 17; and FIG. 19 illustrates a final stage in the process according to the invention.

DETAILED DESCRIPTION OF THE INVENTION

Figure 3:
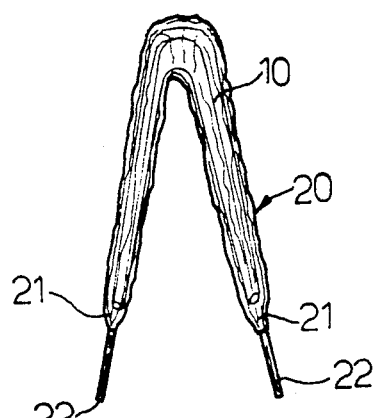
FIGS. 3 and 5 illustrate a second and third stage of the production process according to the invention.
Figure 4:
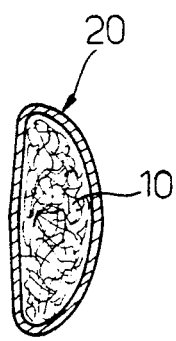
FIGS. 4 and 6 are sections of a partly finished product obtained respectively after the stages of FIGS. 3 and 5.

With reference to the said drawings, a monolithic element made of composite material is generally indicated with the reference numeral 1, in the non-limitative specific example illustrated as an embodiment this being constituted by a bicycle fork; the element 1 comprises an internally hollow body or monolithic element 2 shaped as a fork made by the superimposition and subsequent polymerisation and curing (or, utilising other terminology current with those skilled in the art, "maturation") of a plurality of sheets or woven or non-woven mats of fibres impregnated with a thermosetting synthetic plastics resin (or mixture of resins), and a stem 3 made of metal, in particular aluminium, fixedly mounted at one end 4 of the body 2, and forming part of a more complex, solid reinforcing monolithic element (FIG. 10) comprising the stem 3 and a concave saddle-shape base 5 which, when the element 1 is finished, is encased (embedded) in the end 4 of the fork body 2 as a reinforcement element for this latter. The mats or sheets with which the hollow body or element 2 is formed each comprise (FIG. 1) carbon fibres 8 illustrated in a schematic manner (and/or other material having high strength, such as aramid fibers available under the trademark KEVLAR or other similar material) impregnated with an epoxy resin (and/or resin of other chemical nature) forming a matrix 9 in which the fibres 8 are embedded. The element 2 is formed according to the invention by means of two mould halves 11, 12, starting from a "lost" core 10 constituted by a solid body made by moulding an easily expanded synthetic resin which can be eliminated completely both by heat and by chemical means, in particular polystyrene, into the shape of the hollow element 2 to be obtained (in the particular example illustrated in the form of only part of the final element 1 to be obtained, that is only the hollow fork body 2, the stem 3 being made entirely of metal) and having external dimensions substantially identical to the internal dimensions of the hollow element to be produced, in the example illustrated of the fork body or element 2.

Figure 5:
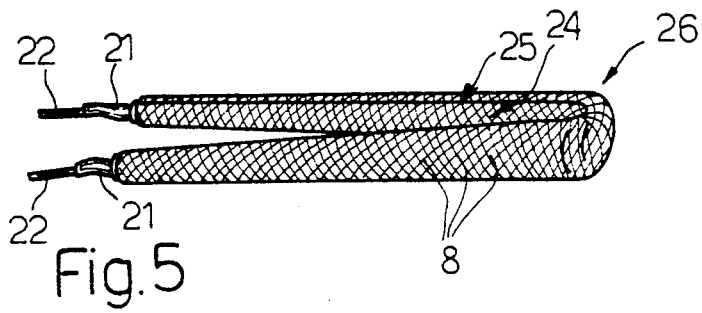
Figure 6:
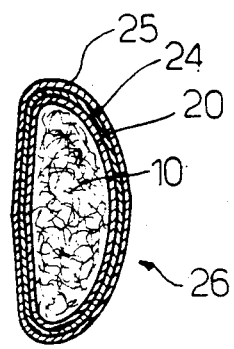
Figure 7:
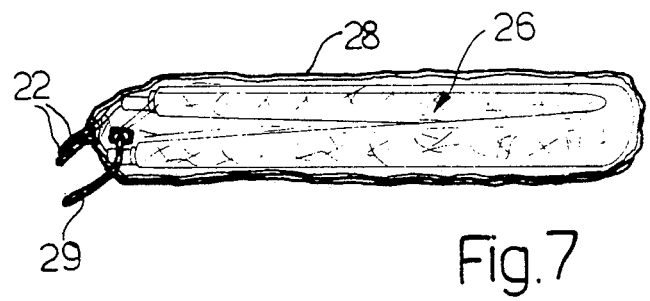

According to the invention (FIG. 2) the mould halves 11 and 12 have respective internal mould cavities 13, having, for convenience, the form and outer dimensions of the complete monolithic element to be obtained, that is, in the specific example, of the entire element 1 and not only of the hollow element 2, and are prepared before use, in a known manner, by the application thereto, in particular to the mould cavities 13, of a release agent 14 which is spread, for example, by means of a brush 15; subsequently the mould halves 11 and 12 are heated in a known oven 16 following a known heat cycle until cooking, with consequent complete polymerisation, of the release agent 14 is obtained. Contemporaneously and/or successively, a first envelope 20 is wrapped in a fluid-tight manner around the core 10, the envelope being made of polyethylene or polythene (or other similar material), obtained for example by wrapping a sheet of polyethylene around the core 10 with its opposite edges then being joined by heat welding, gluing by the application of an adhesive strip or any other means; the envelope 20 follows the shape of the core 10 and terminates with respective terminal ends 21 which are provided, according to the invention, with small tubes 22 of suitable length adapted to ensure in each case the hydraulic connection of the interior of the envelope 20 with the environment outside the envelope (FIG. 3, 4). Then (FIGS. 5 and 6) over the core 10 in the envelope 20 are laminated in a known way a first and a second mat or sheet of carbon fibre 8, respectively indicated 24 and 25, by wrapping the sheet or mat 24 directly over the envelope 20 adhering to the core 10, then wrapping sheet 25 over sheet 24, leaving free only the terminal ends 21 of the envelope 20, with the respective small tubes 22. Having completed this preliminary stage the partly finished product thus obtained, generally indicated 26 in FIGS. 5, 6 and 7, is completely wrapped in a fluid-tight manner within a second envelope 28, again of polyethylene or polythene, which is obtained in the same way as the envelope 20 and sealed onto the ends 21 of this, leaving only the tubes 22 passing out to the exterior through the envelope 28; the envelope 28 is also provided with a tube 29, by means of which hydraulic connection with the interior of the envelope 28 is allowed; thanks to the tubes 22, moreover, the interior of the envelope 20 is in hydraulic communication with the outside of the envelope 28.

Figure 8:
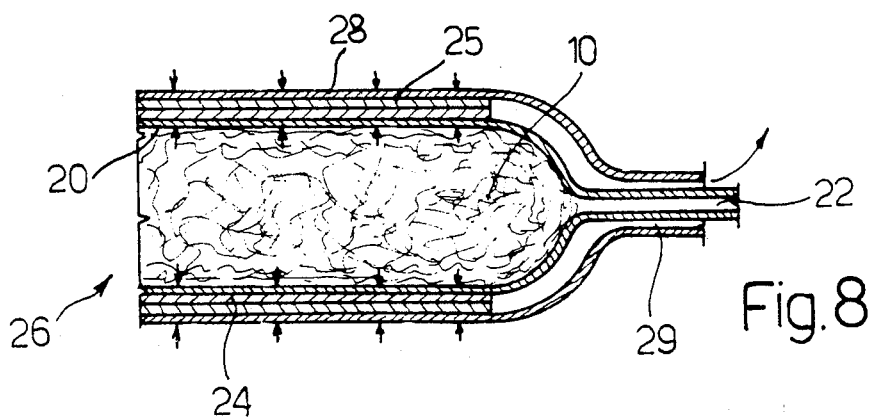

At this point (FIGS. 8 and 9), a depression is created within the interior of the envelope 28 and, subsequently an excess pressure is created outside the envelope 28 and, through the tubes 22, within the envelope 20; for this purpose it is sufficient, for example, to connect the tube 29 by means of a tube 30 to a vacuum pump 31 and, subsequently, having sealed the tube 29, to introduce the pack constituted by the partly finished product 26 and the envelope 28 into an autoclave 32 of known type the interior of which is raised to a predetermined pressure greater than atmosphere, for example three bar. As is schematically illustrated in FIG. 8, during this stage the mats or sheets 24 and 25 previously applied to the core 10 are clamped together by the atmospheric pressure and that reigning in the autoclave 32, assisted by that between the envelopes 20 and 28, in this way becoming compacted in the direction of the arrows; at the same time there is avoided any squashing of the core 10 in that this is preserved by the pressure inside the envelope 20, which is equal to that outside the envelope 28; in fact, whilst the air present between the envelopes 20 and 28 (that is within the interior of the envelope 28) is drawn out by the vacuum pump 31 through the tube 29, the interior of the envelope 20 remains in communication with the outside of the envelope 28, that is to say with the atmosphere and, subsequently, when the partly finished product 26 is introduced into the autoclave 32, with the interior of the autoclave itself, so that its internal pressure can increase in balance with the external pressure thanks to the introduction of fluid through the tubes 32.

Subsequently the pack constituted by the envelope 28 and the partly finished product 26 is withdrawn from the autoclave 32, the envelope 28 is removed and further sheets or mats of impregnated carbon fibre are laminated onto the core and the mats or sheets 24 and 25 previously deposited and compacted thereon, until all the mats or sheets necessary to form the element 2 have been applied over one another onto the core 10.

According to the invention, before initiating this latter lamination stage, onto the already laminated and pre-compacted sheets or mats 24 and 25 there are applied possible rigid reinforcing inserts of metal and/or plastics material; in the non-limitative specific example illustrated (FIGS. 10 and 11) to the roughed out body 2 comprising the core 10 and the pre-compacted sheets or mats 24 and 25 there is applied, in correspondence with the end 4, a saddle-shape base 5 with an associated stem 3 fixed integrally to it and projecting therefrom; therefore, in order to fix the base 5 against the end 4 there are applied a pair of overlapping sheets or mats 33 and 34 which are made to adhere partly to the insert, that is to say in the specific example to the base 5, and partly to the underlying sheets or mats 24, 25. Then on the layers 24, 25 and 33, 34 there are applied, by winding them entirely on the core 10, another two layers or mats 35, 36 so that (FIGS. 12, 13) to obtain a partly finished product 40 constituting a rough blank of the element 1 to be obtained. During the lamination stages described, obviously, layers or mats are utilised having fibres 8 with orientations which are different from layer to layer in such a way as to guarantee the substantial isotropy of the finished product. Having completed the lamination stages of the layers or mats of impregnated fibre, the partly finished product 40 is then inserted between the mould halves 11 and 12 and clamped together by these latter (FIG. 14) and these mould halves 11 and 12 are then wrapped in a fluid-tight manner with a third envelope 42 of polyethylene or polythene (FIG. 15) which is formed like the envelope 10 and which, analogously to what has previously been done with the envelope 20, is sealed at the ends 21 of the envelope 10 in such a way as to leave the tubes 22 passing out through the envelope 42 so that the interior of the envelope 10 is in communication with the outside of the envelope 42 through the tubes 22, possibly connected together to a common connector 44, whilst hydraulic communication between the interior and exterior of the envelope 42 is ensured by a further tube 43 formed directly on the envelope 42 itself.

Having completed the envelope 42 there follows the definitive compaction of all of the layers or mats of impregnated carbon fibres previously laminated onto the core 10, generally indicated with the reference numeral 50 in FIG. 16, by operating as schematically illustrated in this Figure, creating a depression in the interior of the envelope 42 and an excess pressure outside this and, simultaneously, through the tubes 22, to the interior of the envelope 10. This operation is performed in a similar manner to the pre-compaction stage of the layers 24, 25 previously described by drawing the air present in the envelope 42 out through the tube 43 with the vacuum pump 31, then sealing this envelope and finally inserting the pack constituted by the mould halves 11 and 12 and the semi-finished product 40 and the outer envelope 42 into the autoclave. During these operations first the atmospheric pressure and then the pressure in the interior of the autoclave 32 penetrates the interior of the envelope 20 through the tubes 22, "inflating" the envelope 20 (the effect is very exaggerated in FIG. 16) and consequently pressing with a predetermined force the layer 50 of sheets or mats laminated against the mould cavity 13, thus ensuring its perfect compaction on the mould halves 11 and 12 so that the layer 50, which constitutes the rough blank of the hollow element to be obtained, is made to copy perfectly the form of the mould cavity 13 and therefore to assume the definitive form of the hollow element to be obtained. This definitive compaction stage is completed by raising the pressure in the autoclave 32 to around three bar. Then, without opening the autoclave 32, there follows the definitive stage in the procedure for fabrication of the element 1, producing the polymerisation and curing of the layer 50 of sheets or mats simply by proceeding to raise the temperature within the autoclave whilst maintaining its internal pressure at the value of about three bar according to a known heating cycle, for example progressively heating the autoclave to a temperature of about 80°–200° C. for a time variable between several minutes and several hours. The layer 50 of sheets or mats of impregnated fibres, in fact, having completed the definitive compaction stage, find themselves inserted within the interior of the mould 11, 12 in their turn housed in the autoclave 32 and encased within the envelope 43 in which the vacuum has been formed, disposed externally of the core 10 wrapped in the envelope 20 and pressed, by the pressure within this latter, equal to the pressure inside the autoclave 32, against the mould cavity 13; thanks to the hydraulic communication between the interior of the autoclave 32 and the inside of the envelope 20, ensured by the tubes 22, the layer 50 of sheets or mats remains pressed against the mould cavity 13 for the whole of the duration of the polymerisation and curing, in such a way as to ensure that, upon hardening and mutual welding of the various sheets or mats of impregnated fibres they maintain the form imparted by the compaction. In particular, the polymerisation and curing stage now described is conducted at a temperature such as to cause, at least in the final part of this stage, the implosion of the core 10 of polystyrene; this implosion is caused in part by the thermal expansion of the gases contained in the various cells present in the expanded material constituting the core 10 and, in part, by the partial fusion of the material itself; to ensure a better implosion closed cell polystyrene (or other expanded material) can be used for the core 10.

After the polymerisation and curing stage (FIGS. 17, 18), the envelope 42 is removed, the mould 11, 12 opened and cleaned, and from these is extracted a finished monolithic hollow element 1; the envelope 20 is then extracted from the interior of this latter, for example gripping it by the tube 22, thanks to the fact that the imploded core 10 is greatly reduced in volume (if not already practically disappeared, for example by evaporation) and, therefore, no longer retains the envelope 20 against the interior of the element 1; finally (FIG. 19) the possible residue of the implosion of the core can be completely eliminated by introducing into the interior of the finished monolithic element 1 a solvent 60, for example by means of a pump 61, in such a way that the residue dissolves in the solvent and is then drained out from the element 1 together with the solvent itself.

Finally it is to be noted that it has been found experimentally that, to obtain the best surface finish possible for the workpiece 1, it is necessary to use mould halves 11 and 12 and also made, with known techniques, of carbon fibre, rather than conventional moulds of aluminium or the like.

From what has been described the advantages connected with the process according to the invention are evident; in substance, thanks to the combined use of an expanded core, which can be easily eliminated at the final construction operation, and of polythene envelopes connected hydraulically in such a way as to avoid squashing the core during compaction of sheets of carbon fibre laminated onto it, a monolithic hollow element of any shape which is very much lighter and stronger can successfully be obtained, all in a simple and rapid manner, avoiding completely the retention of even part of the core utilised.

What is claimed is:

1. A process for the production of a hollow monolithic element of composite material, by wrapping and superimposing onto a core a plurality of sheets or mats of fibres impregnated with synthetic plastics resin, compaction of the said sheets or mats, and subsequent polymerisation and curing thereof, with the said core positioned between a pair of mould halves clamped together in an autoclave, under predetermined temperature and pressure for a time such as to cause the mutual adhesion thereof, characterised by the fact that a core is utilised, made of an easily eliminable expanded synthetic resin, and by the fact that the compaction of the sheets or mats is effected in the following stages:
   (a) wrapping the core in a fluid-tight manner in a first envelope provided with means for ensuring hydraulic connection of the interior of said first envelope with the environment outside thereto;
   (b) laminating first said sheets or mats onto the core clad with said first envelope;
   (c) wrapping the thus obtained partly finished product in a fluid-tight manner with a second envelope in such a way as to leave the interior of said first envelope, by said hydraulic connection means, in communication with the outside of said second envelope;
   (d) applying a vacuum within the interior of said second envelope and applying pressure through said hydraulic connection means to the interior of said first envelope;
   (e) eliminating said second envelope and laminating onto said core and said first sheets or mats second sheets or mats necessary for forming said element;
   (f) inserting the thus obtained partly finished product between said mould halves, mutual clamping of these latter and wrapping the mould in a fluid-tight manner with a third envelope in a way so as to leave the interior of said first envelope in communication with the outside of said third envelope through said hydraulic connection means; and
   (g) applying a vacuum within the interior of said third envelope and applying pressure through said hydraulic communication means into said first envelope.

2. A process according to claim 1, characterised by the fact that a core is utilised which is constituted by a solid body made by moulding polystyrene in the form of the said hollow element to be obtained and having external dimensions substantially identical with the internal dimensions of the said hollow element to be obtained.

3. A process according to claim 1 characterised by the fact that the said sheets or mats are made of carbon fibres having orientations which differ from layer to layer, impregnated with a thermosetting resin.

4. A process according to claim 3, characterised by the fact that the said carbon fibres are impregnated with an epoxy resin.

5. A process according to claim 1, characterised by the fact that a release agent is applied to the said mould halves prior to their use, after which the mould halves are heated to obtain complete polymerisation of the said release agent.

6. A process according to claim 1, characterised by the fact that before lamination of the said second part of the sheets or mats onto the said core wrapped in the first envelope and in the said first sheets or mats. at least one rigid reinforcing insert is applied to these latter, which insert is connected to the underlying sheets or mats by overlapping laminations of further sheets or mats, which are made to adhere partly to the said insert and partly to the underlying sheets or mats.

7. A process according to claim 1, characterised by the fact that the envelopes are made of polyethylene.

8. A process according to claim 1, characterised by the fact that the said hydraulic connection means between the interior and exterior of the first envelope are constituted by respective tubes formed in correspondence with the terminal ends of the envelope.

9. A process according to claim 8, characterised by the fact that polymerisation and curing of the said sheets or mats is effected by inserting the said mould housing containing it the core wrapped in the first envelope and supporting the sheets or mats in their turn wrapped in the third envelope, into an autoclave after having put the inside of the said third envelope under depression by means of a vacuum pump leaving the open ends of the said tubes outside the said third envelope in such a way that the pressure present within the autoclave is transmitted to the interior of the said first envelope for the whole of the duration of the polymerisation and curing, in such a way as to maintain the said sheets or mats adhering to the internal mould cavity formed by the mould halves and having the external form and dimensions of the hollow element to be obtained.

10. A process according to claim 9, characterised by the fact that the said polymerisation and curing stage is conducted at a temperature such as to cause implosion of the core, and wherein the core is made of polystyrene.

11. A process according to claim 10, characterised by the fact that after the polymerisation and curing stage, the third envelope is removed, the mould halves are opened and cleaned, the first envelope is extracted from the interior of the finished monolithic hollow element by gripping the tubes, and any residue of the imploded core is removed by introducing a solvent to the interior of a finished monolithic element.

12. A process according to claim 1, further including the step of applying pressure to the outside of said second envelope generally simultaneously with applying pressure to the interior of said first envelope in step (d).

13. A process according to claim 12, wherein the pressure applied tot he outside of said second envelope is greater than atmospheric pressure.

14. A process according to claim 12, wherein the pressure applied to the outside of said second envelope is about three bars.

15. A process according to claim 12, wherein the pressure applied to the interior of said first envelope in step (d) is substantially the same as the outside pressure applied to said second envelope.

16. A process according to claim 1, further including the step of applying pressure to the outside of said third envelope generally simultaneously with applying pressure to the interior of said first envelope in step (g).

17. A process according to claim 16, wherein the pressure applied to the outside of said third envelope is greater than atmospheric pressure.

18. A process according to claim 16, wherein the pressure applied to the outside of said third envelope is about three bars.

19. A process according to claim 16, wherein the pressure applied to the interior of said first envelope in step (g) is substantially the same as the outside pressure applied to said third envelope.

* * * * *